(12) United States Patent
Pawloski

(10) Patent No.: US 7,494,333 B2
(45) Date of Patent: Feb. 24, 2009

(54) APPARATUS FOR FORMING MULTIPLE CLOSURE ELEMENTS

(75) Inventor: James C. Pawloski, Bay City, MI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 965 days.

(21) Appl. No.: 10/861,607

(22) Filed: Jun. 4, 2004

(65) Prior Publication Data

US 2005/0269733 A1    Dec. 8, 2005

(51) Int. Cl.
*B29C 47/12* (2006.01)

(52) U.S. Cl. .............. 425/183; 156/244.11; 425/192 R; 425/382 R; 425/464

(58) Field of Classification Search ................ 425/183, 425/192 R, 382 R, 464; 156/244.11
See application file for complete search history.

(56) References Cited

U.S. PATENT DOCUMENTS

| | | | |
|---|---|---|---|
| 475,248 A | 5/1892 | Pugsley | |
| 1,746,565 A | 2/1930 | Sundback | |
| 1,959,318 A | 5/1934 | Sundback | |
| 2,354,485 A | 7/1944 | Slaughter | |
| 2,916,197 A | 12/1959 | Detrie et al. | |
| 3,038,225 A | 6/1962 | Ausnit | |
| 3,198,228 A | 8/1965 | Naito et al. | |
| 3,226,787 A * | 1/1966 | Ausnit | 24/586.1 |
| 3,237,844 A | 3/1966 | Hughes | |
| 3,265,789 A | 8/1966 | Hofer | |
| 3,338,284 A | 8/1967 | Ausnit | |
| 3,338,285 A | 8/1967 | Jaster | |
| 3,340,116 A | 9/1967 | Naito | |
| 3,347,298 A | 10/1967 | Ausnit et al. | |
| 3,372,442 A | 3/1968 | Ishimatsu | |
| 3,410,327 A | 11/1968 | Ausnit | |
| 3,416,199 A | 12/1968 | Imamura | |
| 3,462,332 A | 8/1969 | Goto | |
| 3,528,600 A | 9/1970 | White | |
| 3,537,153 A | 11/1970 | Ausnit | |
| 3,565,147 A | 2/1971 | Ausnit | |
| 3,565,737 A | 2/1971 | Lefevre et al. | |
| RE27,174 E | 9/1971 | Ausnit | |

(Continued)

FOREIGN PATENT DOCUMENTS

CA    764647    8/1967

(Continued)

OTHER PUBLICATIONS

Web page from www.zippak.com "One-Time Locking Zipper", Aug. 28, 2003.

(Continued)

*Primary Examiner*—Robert B Davis
*Assistant Examiner*—Joseph Leyson

(57) ABSTRACT

A method of extruding two or more closure elements onto a web includes extruding the closure elements through a die plate having a first aperture for a first closure element and a second aperture for a second closure element. The first aperture is spaced from and at least partially overlaps the second aperture in a lateral direction. The partial overlapping of the apertures allows the closure elements to be spaced very closely together on the web. The space between the apertures prevents extrudate streams forming the elements from bonding to each other. The closely spaced elements are extruded through the same die plate without an interconnecting portion therebetween.

11 Claims, 4 Drawing Sheets

U.S. PATENT DOCUMENTS

| | | |
|---|---|---|
| 3,608,439 A | 9/1971 | Ausnit |
| 3,715,420 A | 2/1973 | Kiyono et al. |
| 3,780,781 A | 12/1973 | Uramoto |
| 3,827,472 A | 8/1974 | Uramoto |
| 3,840,418 A | 10/1974 | Sabee |
| 3,841,816 A | 10/1974 | Herz |
| 3,937,395 A | 2/1976 | Lawes |
| RE28,969 E | 9/1976 | Naito |
| 4,046,408 A | 9/1977 | Ausnit |
| 4,087,577 A | 5/1978 | Hendrickson |
| 4,139,664 A | 2/1979 | Wenrick |
| 4,240,604 A | 12/1980 | Brach |
| 4,259,133 A | 3/1981 | Yagi |
| 4,263,079 A | 4/1981 | Sutrina et al. |
| 4,268,938 A | 5/1981 | Walchli |
| 4,279,677 A | 7/1981 | Takahashi |
| 4,295,919 A | 10/1981 | Sutrina et al. |
| 4,306,924 A | 12/1981 | Kamp |
| 4,315,963 A | 2/1982 | Havens |
| 4,354,541 A | 10/1982 | Tilman |
| 4,358,334 A | 11/1982 | Sutrina et al. |
| 4,363,345 A | 12/1982 | Scheibner |
| 4,372,014 A | 2/1983 | Simpson |
| 4,392,897 A | 7/1983 | Herrington |
| 4,419,159 A | 12/1983 | Herrington |
| 4,428,788 A | 1/1984 | Kamp |
| 4,484,352 A | 11/1984 | Katzin |
| 4,515,647 A | 5/1985 | Behr |
| 4,522,678 A | 6/1985 | Zieke |
| 4,532,652 A | 7/1985 | Herrington |
| 4,540,537 A | 9/1985 | Kamp |
| 4,555,282 A | 11/1985 | Yano |
| 4,561,108 A | 12/1985 | Kamp |
| 4,561,109 A | 12/1985 | Herrington |
| 4,562,027 A | 12/1985 | Behr et al. |
| 4,578,813 A | 3/1986 | Ausnit |
| 4,615,045 A | 9/1986 | Siegel |
| 4,618,383 A | 10/1986 | Herrington |
| 4,655,862 A | 4/1987 | Christoff et al. |
| 4,665,557 A | 5/1987 | Kamp |
| 4,672,723 A | 6/1987 | Hugues et al. |
| 4,673,383 A | 6/1987 | Bentsen |
| 4,676,851 A | 6/1987 | Scheibner et al. |
| 4,683,015 A | 7/1987 | Wagers |
| 4,684,018 A | 8/1987 | Jarund |
| 4,698,118 A | 10/1987 | Takahashi |
| 4,701,358 A | 10/1987 | Behr et al. |
| 4,709,399 A | 11/1987 | Sanders |
| 4,710,968 A | 12/1987 | Borchardt et al. |
| 4,727,709 A | 3/1988 | Zieke et al. |
| 4,736,451 A | 4/1988 | Ausnit |
| 4,736,496 A | 4/1988 | Fisher et al. |
| 4,741,789 A | 5/1988 | Zieke et al. |
| 4,755,248 A | 7/1988 | Geiger et al. |
| 4,764,977 A | 8/1988 | Wagers |
| 4,765,036 A | 8/1988 | Iguchi et al. |
| 4,778,282 A | 10/1988 | Borchardt et al. |
| 4,787,880 A | 11/1988 | Ausnit |
| 4,791,710 A | 12/1988 | Nocek et al. |
| 4,792,240 A | 12/1988 | Ausnit |
| 4,796,300 A | 1/1989 | Branson |
| 4,812,056 A | 3/1989 | Zieke |
| 4,812,192 A | 3/1989 | Woods et al. |
| 4,822,539 A | 4/1989 | Tilman et al. |
| 4,829,641 A | 5/1989 | Williams |
| 4,832,768 A | 5/1989 | Takahashi |
| 4,834,554 A | 5/1989 | Stetler, Jr. et al. |
| 4,835,835 A | 6/1989 | Gould |
| 4,846,586 A | 7/1989 | Bruno |
| 4,854,917 A | 8/1989 | Mizukoshi |
| 4,859,259 A | 8/1989 | Scheibner |
| 4,869,725 A | 9/1989 | Schneider et al. |
| 4,898,492 A | 2/1990 | Janowski |
| 4,906,310 A | 3/1990 | Broderick et al. |
| 4,907,321 A | 3/1990 | Williams |
| 4,929,487 A | 5/1990 | Tilman et al. |
| 4,964,739 A | 10/1990 | Branson et al. |
| 5,009,828 A | 4/1991 | McCree |
| 5,012,561 A | 5/1991 | Porchia et al. |
| 5,017,021 A | 5/1991 | Simonsen et al. |
| 5,022,530 A | 6/1991 | Zieke |
| 5,023,122 A | 6/1991 | Boeckmann et al. |
| 5,049,223 A | 9/1991 | Dais et al. |
| 5,053,091 A | 10/1991 | Giljam et al. |
| 5,056,933 A | 10/1991 | Kamp |
| 5,067,822 A | 11/1991 | Wirth et al. |
| 5,070,584 A | 12/1991 | Dais et al. |
| 5,092,684 A | 3/1992 | Weeks |
| 5,138,750 A | 8/1992 | Gundlach et al. |
| 5,140,727 A | 8/1992 | Dais et al. |
| 5,141,577 A | 8/1992 | Porchia et al. |
| 5,154,086 A | 10/1992 | Porchia et al. |
| 5,167,454 A | 12/1992 | Woods et al. |
| 5,192,135 A | 3/1993 | Woods et al. |
| 5,198,055 A | 3/1993 | Wirth et al. |
| 5,209,574 A | 5/1993 | Tilman |
| 5,211,481 A | 5/1993 | Tilman |
| 5,235,731 A | 8/1993 | Anzai et al. |
| 5,238,306 A | 8/1993 | Heintz et al. |
| 5,248,201 A | 9/1993 | Kettner et al. |
| 5,252,281 A | 10/1993 | Kettner et al. |
| 5,259,904 A | 11/1993 | Ausnit |
| 5,307,552 A | 5/1994 | Dais et al. |
| 5,326,176 A | 7/1994 | Domke |
| 5,356,222 A | 10/1994 | Kettner et al. |
| 5,358,334 A | 10/1994 | Simonsen |
| 5,366,294 A | 11/1994 | Wirth et al. |
| 5,368,394 A | 11/1994 | Scott et al. |
| 5,369,847 A | 12/1994 | Naya et al. |
| 5,382,094 A | 1/1995 | Ausnit |
| 5,384,942 A | 1/1995 | Siegel |
| 5,388,910 A | 2/1995 | Koyanagi |
| 5,397,182 A | 3/1995 | Gaible et al. |
| 5,403,094 A | 4/1995 | Tomic |
| 5,405,561 A | 4/1995 | Dais et al. |
| 5,411,692 A | 5/1995 | DiPietro et al. |
| 5,415,904 A | 5/1995 | Takubo et al. |
| 5,425,911 A | 6/1995 | Tomic et al. |
| 5,462,360 A | 10/1995 | Tilman et al. |
| 5,470,156 A | 11/1995 | May |
| 5,472,082 A | 12/1995 | Thiele |
| 5,478,228 A | 12/1995 | Dais et al. |
| 5,492,705 A | 2/1996 | Porchia et al. |
| 5,509,734 A | 4/1996 | Ausnit |
| 5,511,884 A | 4/1996 | Bruno et al. |
| 5,525,363 A | 6/1996 | Herber et al. |
| 5,527,112 A | 6/1996 | Dais et al. |
| 5,558,439 A | 9/1996 | Tilman |
| 5,564,834 A | 10/1996 | Porchia et al. |
| 5,575,747 A | 11/1996 | Dais et al. |
| 5,577,305 A | 11/1996 | Johnson |
| 5,618,111 A | 4/1997 | Porchia et al. |
| 5,647,100 A | 7/1997 | Porchia et al. |
| 5,660,479 A | 8/1997 | May et al. |
| 5,664,299 A | 9/1997 | Porchia et al. |
| 5,669,715 A | 9/1997 | Dobreski et al. |
| 5,672,009 A | 9/1997 | Malin |
| 5,686,126 A | 11/1997 | Noel et al. |
| 5,689,866 A | 11/1997 | Kasai et al. |
| 5,713,669 A | 2/1998 | Thomas et al. |
| 5,718,024 A | 2/1998 | Robbins |
| 5,722,128 A | 3/1998 | Toney et al. |
| 5,729,876 A | 3/1998 | Johnson |
| 5,749,658 A | 5/1998 | Kettner |

| | | |
|---|---|---|
| 5,769,772 A | 6/1998 | Wiley |
| 5,774,954 A | 7/1998 | Ramsey et al. |
| 5,774,955 A | 7/1998 | Borchardt et al. |
| 5,775,812 A | 7/1998 | St. Phillips et al. |
| 5,783,012 A | 7/1998 | Porchia et al. |
| 5,791,783 A | 8/1998 | Porchia et al. |
| 5,794,315 A | 8/1998 | Crabtree et al. |
| 5,804,265 A | 9/1998 | Saad et al. |
| 5,809,621 A | 9/1998 | McCree et al. |
| 5,817,380 A | 10/1998 | Tanaka |
| 5,827,163 A | 10/1998 | Kettner |
| 5,832,145 A | 11/1998 | Dais et al. |
| 5,832,570 A | 11/1998 | Thorpe et al. |
| 5,832,699 A | 11/1998 | Zobel |
| 5,836,056 A | 11/1998 | Porchia et al. |
| 5,839,831 A | 11/1998 | Mazzocchi |
| D406,685 S | 3/1999 | McGinnis |
| 5,878,468 A | 3/1999 | Tomic et al. |
| 5,894,707 A | 4/1999 | May |
| 5,902,046 A | 5/1999 | Shibata |
| 5,911,508 A | 6/1999 | Dobreski et al. |
| 5,927,855 A | 7/1999 | Tomic et al. |
| 5,930,877 A | 8/1999 | Thorpe et al. |
| 5,931,582 A | 8/1999 | Nichols |
| 5,933,927 A | 8/1999 | Miller et al. |
| 5,950,285 A | 9/1999 | Porchia et al. |
| 5,953,796 A | 9/1999 | McMahon et al. |
| 5,955,160 A | 9/1999 | Tanaka et al. |
| 5,962,040 A | 10/1999 | Dais et al. |
| 5,964,532 A | 10/1999 | St. Phillips et al. |
| 5,988,880 A | 11/1999 | Tomic |
| 6,009,603 A | 1/2000 | Gallagher |
| 6,010,244 A | 1/2000 | Dobreski et al. |
| 6,014,795 A | 1/2000 | McMahon et al. |
| 6,021,557 A | 2/2000 | Dais et al. |
| 6,030,122 A | 2/2000 | Ramsey et al. |
| 6,032,437 A | 3/2000 | Bois |
| 6,071,011 A | 6/2000 | Thomas et al. |
| 6,074,096 A | 6/2000 | Tilman |
| 6,077,208 A | 6/2000 | Larkin et al. |
| 6,080,252 A | 6/2000 | Plourde |
| 6,085,906 A | 7/2000 | Lambert |
| 6,110,586 A | 8/2000 | Johnson |
| 6,112,374 A | 9/2000 | Van Erden |
| 6,135,636 A | 10/2000 | Randall |
| 6,138,329 A | 10/2000 | Johnson |
| 6,148,588 A | 11/2000 | Thomas et al. |
| 6,149,302 A | 11/2000 | Taheri |
| 6,152,600 A | 11/2000 | Tomic |
| 6,156,363 A | 12/2000 | Chen et al. |
| 6,164,825 A | 12/2000 | Larkin et al. |
| 6,167,597 B1 | 1/2001 | Malin |
| 6,170,985 B1 | 1/2001 | Shabram, Jr. et al. |
| 6,185,796 B1 | 2/2001 | Ausnit |
| 6,187,396 B1 | 2/2001 | Möller |
| 6,212,061 B1 | 4/2001 | Irwin et al. |
| 6,217,215 B1 | 4/2001 | Tomic |
| 6,217,216 B1 | 4/2001 | Taheri |
| 6,221,484 B1 | 4/2001 | Leiter |
| 6,228,485 B1 | 5/2001 | Leiter |
| 6,231,236 B1 | 5/2001 | Tilman |
| 6,257,763 B1 | 7/2001 | Stolmeier et al. |
| 6,279,298 B1 | 8/2001 | Thomas et al. |
| 6,286,681 B1 | 9/2001 | Wilfong, Jr. et al. |
| 6,286,999 B1 | 9/2001 | Cappel et al. |
| 6,299,720 B1 | 10/2001 | Van Erden |
| 6,318,894 B1 | 11/2001 | Derenthal |
| 6,321,423 B1 | 11/2001 | Johnson |
| 6,360,513 B1 | 3/2002 | Strand et al. |
| 6,364,915 B1 | 4/2002 | Chapman-Irwin et al. |
| 6,461,042 B1 | 10/2002 | Tomic et al. |
| 6,461,043 B1 | 10/2002 | Healy et al. |
| 6,481,890 B1 | 11/2002 | VandenHeuvel |
| 6,487,758 B2 | 12/2002 | Shaffer et al. |
| 6,491,433 B2 | 12/2002 | Shabram, Jr. et al. |
| 6,539,594 B1 | 4/2003 | Kasai et al. |
| 6,582,122 B2 | 6/2003 | Shimizu |
| 6,592,260 B1 | 7/2003 | Randall et al. |
| 6,594,868 B1 | 7/2003 | Savicki |
| 6,594,872 B2 | 7/2003 | Cisek |
| 6,605,026 B1 | 8/2003 | Tomic |
| 6,637,939 B2 | 10/2003 | Huffer |
| 6,686,005 B2 | 2/2004 | White et al. |
| 6,691,383 B2 | 2/2004 | Linton |
| 6,712,509 B2 | 3/2004 | Cappel |
| 2001/0043763 A1 | 11/2001 | Saad et al. |
| 2002/0090151 A1 | 7/2002 | Skeens et al. |
| 2002/0114540 A1 | 8/2002 | Shimizu |
| 2002/0153273 A1 | 10/2002 | Mallik et al. |
| 2002/0173414 A1 | 11/2002 | Leighton |
| 2003/0033694 A1 | 2/2003 | Cisek |
| 2003/0066267 A1 | 4/2003 | Nelson |
| 2003/0077008 A1 | 4/2003 | Plourde et al. |
| 2003/0077243 A1 | 4/2003 | Fitzhugh et al. |
| 2003/0167607 A1 | 9/2003 | Linton |
| 2003/0169947 A1 | 9/2003 | Taheri |
| 2003/0169948 A1 | 9/2003 | Fenzl et al. |
| 2003/0177619 A1 | 9/2003 | Cisek |
| 2003/0210836 A1 | 11/2003 | Strand |
| 2003/0219174 A1 | 11/2003 | Piechocki |
| 2003/0223654 A1 | 12/2003 | Gerrits |
| 2003/0223657 A1 | 12/2003 | Belias et al. |
| 2004/0001650 A1 | 1/2004 | Piechocki et al. |
| 2004/0047521 A1 | 3/2004 | Berich et al. |
| 2004/0078940 A1 | 4/2004 | Ishizaki |
| 2004/0091179 A1 | 5/2004 | Anderson |

FOREIGN PATENT DOCUMENTS

| | | |
|---|---|---|
| DE | 2 036 432 | 2/1971 |
| DE | 30 32 889 | 12/1981 |
| EP | 0 025 656 | 3/1981 |
| EP | 0 089 680 | 9/1983 |
| EP | 0 114 373 | 8/1984 |
| EP | 0 155 612 | 9/1985 |
| EP | 0 209 453 | 1/1987 |
| EP | 0 220 476 | 5/1987 |
| EP | 0 241 334 | 10/1987 |
| EP | 0 398 731 | 11/1990 |
| EP | 0 427 010 | 5/1991 |
| EP | 0 543 737 | 5/1993 |
| EP | 1 329 387 | 7/2003 |
| FR | 1493748 | 7/1967 |
| FR | 2 620 377 | 3/1989 |
| GB | 1092452 | 11/1967 |
| GB | 1156170 | 6/1969 |
| GB | 1326945 | 8/1973 |
| GB | 2 008 538 | 6/1979 |
| GB | 2 116 144 | 9/1983 |
| JP | 3 212355 | 9/1991 |
| JP | 4057768 | 2/1992 |
| JP | 6 99991 | 4/1994 |
| JP | 6 227551 | 8/1994 |
| WO | WO 88/04634 | 6/1988 |
| WO | WO 02/34634 | 5/2002 |

OTHER PUBLICATIONS

Web page from www.zippak.com "At-140 Zipper", Aug. 28, 2003.
Web page from www.ambag.com "Double Track Seal Top Bags", Nov. 22, 2002.
Web pages from www.ambag.com "Ambag Corporation Custom Plain Bag Guidelines" (7 pages), Dec. 17, 2002.
Web pages from www.plastic-bags.net "Plastic Bags" (5 pages), Dec. 17, 2002.
Photo-micrograph of "Fresh Pack Zipper" from Chantler Packaging (see http://www.chantlerpackaging.com). No date.

Web pages of "Ziplock Bag," by Rean Tai Plastic Co., Ltd at http://www.reantai.ttnet.net, (4 pages). Mar. 3, 2004.

Photographs of "Zipper Bag" from Thai Griptech Co., Ltd, of Thailand (3 pages). No date.

Photo-micropgraph of "Zipper Bag" from Thai Griptech Co., Ltd. of Thailand. No date.

Photographs of "Ziploc Heavy Duty Big Bags" from S. C. Johnson & Son, Inc., Large 2¼ Gallon Size (8.52 L), (4 pages). No Date.

Photographs of "Vegetables & Fruits Fresh Pack" from Slim Kitchen, 280mmX270mm, (3 pages). No date.

Photographs of "Breast Milk Storage Bags" from Lansinoh, (4 pages). No date.

Web pages of "Breast Milk Storage Bags" by Lansinoh at http://store.babycenter.com/product/feeding/breastfeeding/pump accessories/3961, (2 pages). Feb. 2, 2004.

Photographs of box for "Breast Milk Storage Bags" by Lansinoh, (2 pages). No date.

Photographs of double zipper bag, name and origin unknown, (4 pages). No date.

Web pages of "4-Mil Double-Track Zip Poly Bags" advertised by Realemall.com at http://office-supply.realemall.com/B-O-X-Packaging/4Mil-DoubleTrack-Zip-Poly-Bags.asp, 5 pages. Apr. 7, 2004.

Web pages of "4-Mil Double-Track Zip Poly Bags" sold by Office Depot, 12" x 15", Box Of 500, at http://www.officedepot.com/ddSKU.do?level=SK&id=499978, 2 pages. Apr. 7, 2004.

Web article "MS-1000 Offers Maximum Versatility" May 20, 2002 at http://www.packexpo.com/ve/34472/news/3070.html, 2 pages. Aug. 25, 2003.

Web pages of "Drawstring Bags" advertised manufactured by Co-Ordinated Packaging, Inc. at http://www.co-ordinatedpackaging.com/specimen_bags.htm, 2 pages. Aug. 25, 2003.

* cited by examiner

APPARATUS FOR FORMING MULTIPLE CLOSURE ELEMENTS

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates to a method of and apparatus for forming closures for reclosable pouches, and more particularly, to an extrusion process and apparatus for forming multiple closure elements.

2. Description of the Background of the Invention

A reclosable thermoplastic pouch includes a closure disposed at a mouth of the bag. Recently, pouches have been developed wherein the closure comprises multiple closure elements. The closure is typically formed by extruding two closure elements connected by an intermediate portion through an aperture of a die plate. An example of one such closure, depicted in FIG. 1, includes adjacent closure elements 11 connected by a base portion 13. Another example of such a closure, depicted in FIG. 2, includes two closure elements integrally extruded with a bag web such that the closure elements are connected by an intermediate bag web portion. It can be difficult to design a die plate for extruding such closures because of difficulties encountered in controlling neck-in and shrinkage of the extruded elements.

Zieke et al. U.S. Pat. No. 4,741,789 discloses a zipper and a method of extruding the zipper onto a plastic film web. The zipper includes a base member, a single closure member protruding from the base member, and a pair of guide ribs on the base member on opposite sides of the closure member. During formation of the zipper, the web is drawn from a roll over a lamination cylinder, and the base member is extruded onto the web as the web passes over the lamination cylinder. The single closure member and ribs are then extruded onto the base member as the film and base member pass over the lamination cylinder. The single closure member and the two guide ribs are extruded through separate apertures that are vertically spaced from and laterally overlapping each other.

Goulde U.S. Pat. No. 4,835,835 discloses a method of extruding a fastener strip having a plurality of interlocking closure elements. The interlocking elements are connected by a base portion. The closure elements and the base portion are extruded through a single die plate aperture.

DiPietro et al. U.S. Pat. No. 5,411,692 discloses a method of and apparatus for extruding a bag film and a closure profile integrally connected to the bag film. A single die is used for extruding the film and closure profile. The film is extruded through a main plenum and the closure profile is extruded through a channel that is diverted from the main plenum. The channel and the main plenum converge upstream of a die exit port so that the closure profile is reunited with the film prior to exiting the die.

Tomic et al. U.S. Pat. No. 5,425,911 discloses a method of extruding a bag film with an integral closure strip having two interlocking closure elements and a die assembly for use in the method. The film is extruded through a thin outlet port between two opposing die lips in the die assembly. The closure elements are extruded integrally with the film through a set of grooves in one of the die lips.

Plourde U.S. Pat. No. 6,080,252 discloses a method of forming a zipper component for subsequent attachment to a bag wall. A flange is extruded onto a continuous carrier web, and a single profile is extruded onto the flange while the flange is on the carrier web. The resulting component is then cooled and stripped from the carrier web.

SUMMARY OF THE INVENTION

In one embodiment of the invention, a method of forming a first closure element and a second closure element on a film web includes the steps of passing a polymer film web having a lateral width adjacent to an extrusion die and extruding the first and second closure elements at the same time directly onto the web. The closure elements are extruded such that the first closure element is laterally spaced from the second closure element on the web. The first closure element is extruded from a first aperture that is spaced from and partially overlaps laterally a second aperture from which the second closure element is extruded.

In another embodiment of the invention, a die plate includes a first aperture through a face of the die plate and a second aperture through the face. The first aperture is shaped for extruding a first closure element onto a polymer web having a lateral width and the second aperture is shaped for extruding a second closure element. The first aperture is spaced from the second aperture on the face and partially overlaps the second aperture in the lateral direction

DETAILED DESCRIPTION OF THE DRAWINGS

Figure 1:
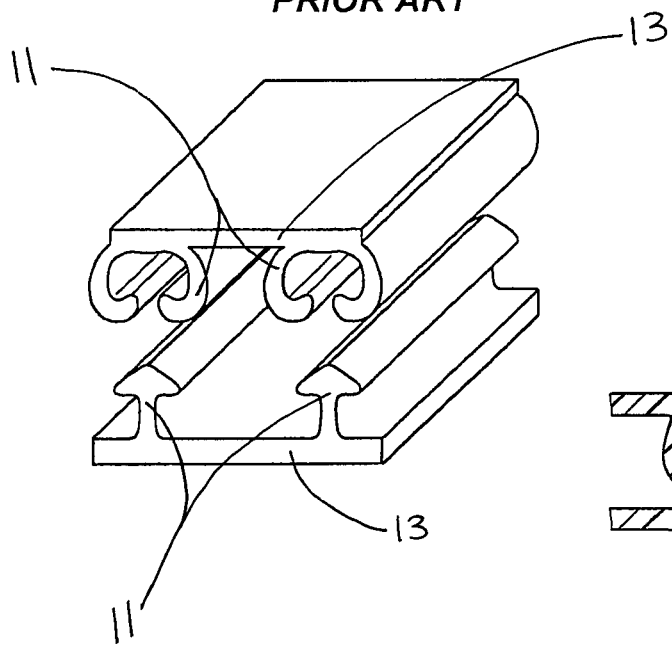
FIG. 1 is a fragmentary isometric view of a prior art closure assembly.
Figure 2:
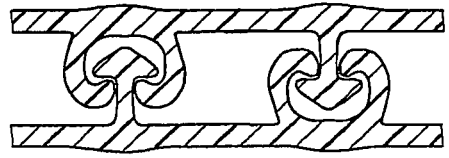
FIG. 2 is a fragmentary sectional view of a second prior art closure assembly.
Figure 3:
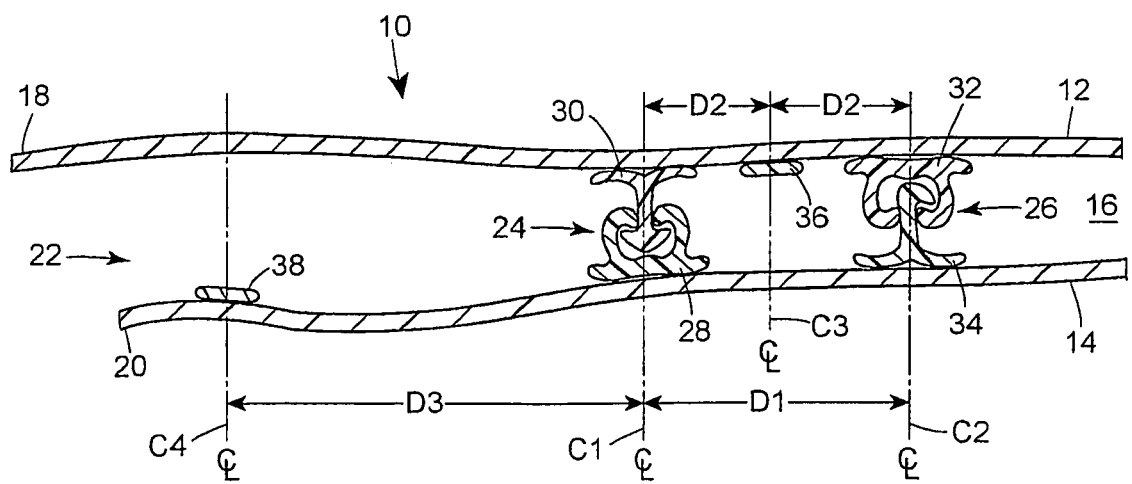
FIG. 3 is a fragmentary sectional view of a pouch having two closure mechanisms formed by the present invention.

Referring to FIG. 3, a reclosable pouch 10 in the form of a thermoplastic storage bag comprises first and second bag walls 12, 14 that are joined to each other along three edges (not shown) to define an interior 16 between the bag walls. Each bag wall 12, 14 has a lip portion 18, 20, respectively, which together form an opening or mouth 22 into the interior 16. The pouch 10 also includes first and second closure mechanisms 24, 26 disposed along the bag walls adjacent the mouth 22. The first closure mechanism 24 is disposed between the second closure mechanism 26 and the lips 18, 20. The first closure mechanism 24 comprises a first female closure element 28 and a first male closure element 30. The second closure mechanism 26 comprises a second female closure element 32 and a second male closure element 34. The first male closure element 30 and the second female closure element 32 are located on the first bag wall 12, and the first female closure element 28 and the second male closure element 34 are located on the second bag wall 14. A bead element 36 is located on the first bag wall 12 between the first male closure element 30 and the second female closure element 32. A bead element 38 is located on the second bag wall 14 adjacent the mouth 22 between the lip 20 and the first closure mechanism 24. The first male and female closure elements 28, 30 are substantially aligned along a centerline C1, the second male and female closure elements 32, 34 are substantially aligned along a second centerline C2, and the bead elements 36, 38 are located at centerlines C3 and C4, respectively. The centerlines C1 and C2 are spaced apart a distance D1, which is preferably small enough to cause the first and second closure mechanisms 24, 26 to feel like a single closure to a user attempting to interlock the opposing closure elements. A distance D2 between the centerline C3 and each of the centerlines C1 and C2 is preferably one-half the distance D1. A distance D3 between the centerlines C1 and C4 may be any distance that is sufficient to place the bead element 38 near the lip 20. In a preferred embodiment, the distance D1 is 0.2 inch (5.08 mm), the distance D2 is 0.1 inch (2.54 mm), and the distance D3 is 0.5 inch (12.7 mm). It should be understood, however, that the method and apparatus of the present invention is not limited to this particular choice or configuration of closure elements, but rather may be used for forming a pouch having any number, kind, or arrangement of separate closure and bead elements or other types of individually extruded elements.

Figure 4:
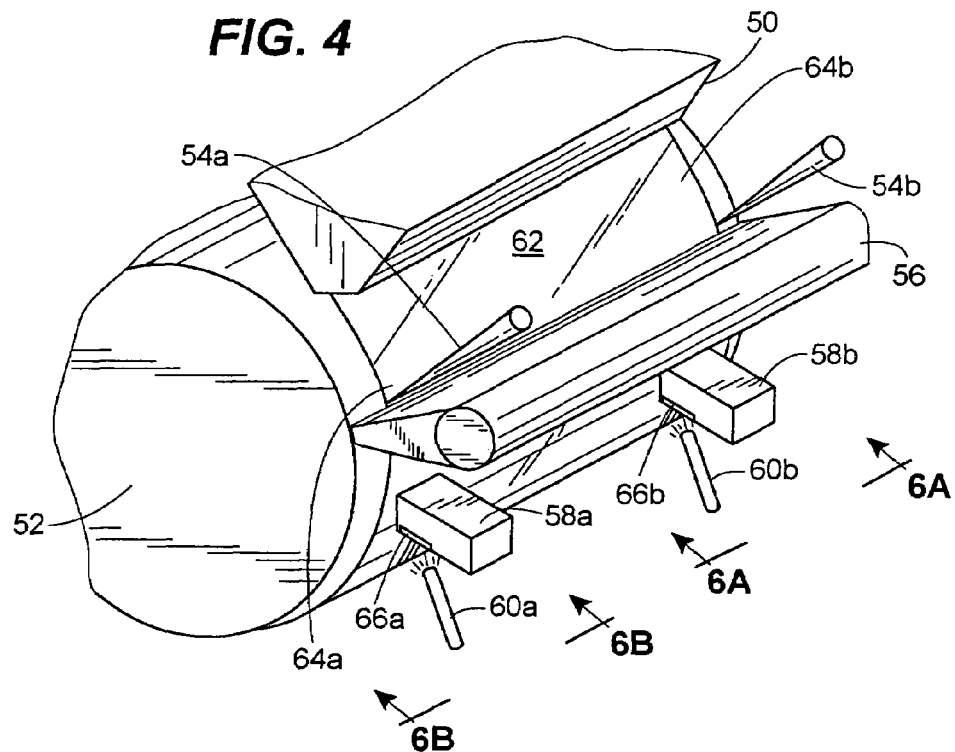
FIG. 4 is a fragmentary diagrammatic view of an extrusion apparatus for extruding closure mechanisms according to the method of the present invention.

A hybrid integral/post applied process using the apparatus shown in FIG. 4 may be used to produce the pouch disclosed above. The process utilizes an extrusion apparatus including a first extrusion slot die 50, a temperature-controlled driven casting roll 52, edge pinning devices or apparatus 54a, 54b, an air knife 56, second and third extrusion dies 58a, 58b, and cooling apparatus 60a, 60b. The extrusion die 50 receives molten thermoplastic from an extruder (not shown) and deposits the thermoplastic in sheet form as a web 62 onto the casting roll 52. Edge portions 64a, 64b of the resulting web 62 are pinned to the casting roll 52 by the edge pinning devices 54a, 54b, respectively. The web 62 is then pinned across the entire width thereof (i.e., as a whole) to the casting roll 52 by the air knife 56.

After the web 62 is pinned to the casting roll 52, the closure elements 28-34 and bead elements 36, 38 are formed onto the edge portions 64a, 64b of the web 62. Preferably, the extrusion dies 58a, 58b receive molten thermoplastic from separate extruders and extrude the male and female closure elements 28, 34 and 30, 32 onto the edge portions 64a and 64b, respectively. Alternatively, the separate extrusion dies 58a, 58b may be replaced by a single extrusion die having two outlets at which the male and female closure elements 28, 34 and 30, 32 are simultaneously extruded onto the edge portions 64a and 64b, respectively. Regardless of which extrusion process is used, the extrusion die 58a includes a first die plate 66a (depicted in detail in FIG. 5A) for forming the closure and bead elements 28, 34, 38 adjacent the first edge portion 64a, and the extrusion die 58b includes a second die plate 66b (depicted in detail in FIG. 5B) for forming the closure and bead elements 30, 32, 36 adjacent the second edge portion 64b.

Figure 5A:
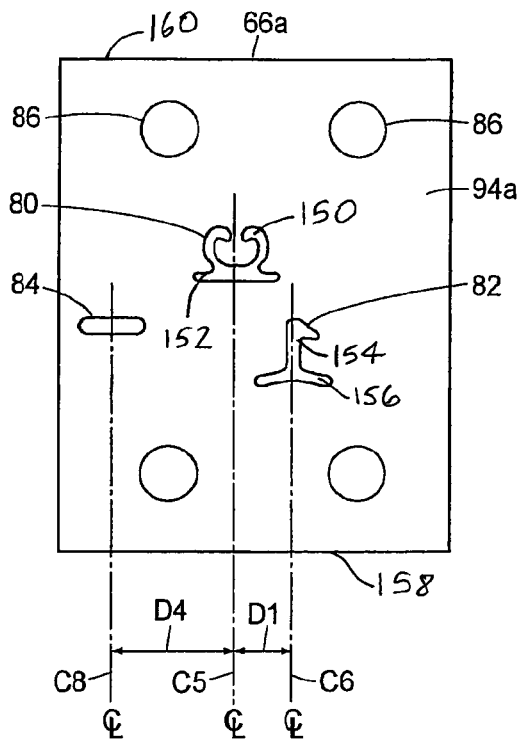
FIGS. 5A and 5B are elevational views of exit faces of die plates according to the present invention.

Referring to FIG. 5A, the first die plate 66a includes a first female aperture 80, a first male aperture 82, and a first bead aperture 84, through which thermoplastic material is extruded to form the closure and bead elements 28, 34, and 38, respectively. As shown in FIG. 5A, the female aperture 80 outlines a closure element 150 extending from a to side of a base portion 152 and the male aperture 82 similarly outlines a closure element 154 extending from a top side of a base portion 156, wherein each of the base portions 152. 156 is oriented toward a bottom edge 158 of the die plate 66a and each of the closure elements 150. 154 is oriented toward a top edge 160 opposite the bottom edge 158. The die plate 66a is secured to the extrusion die 58a by any suitable means, such as fasteners (not shown) through holes 86. Each aperture 80-84 has the same general shape as the profile of the element extruded therefrom, except that the aperture is considerably larger than the resulting element profile due to neck-in and/or shrinking of the freshly extruded element as the element is transferred to the web 62 from the aperture. The apertures 80 and 82 are disposed on centerlines C5 and C6 that are aligned with the centerlines C1 and C2, respectively, such that the centerlines of the apertures are laterally spaced from each other by the distance D1. The aperture 84 is disposed on centerline C8, which is laterally spaced from the centerline C5 a distance D4. The centerline C8 may be either aligned with the centerline C4 or it may be laterally offset therefrom such that D3 may be the same or different from D4, as explained in greater detail below. In order to achieve a small lateral spacing between the element centerlines C1 and C2, the outlines of the apertures 80 and 82 must partially overlap because of the larger sizes of the apertures required to accommodate neck-in and shrinking of the extruded elements 28, 34. Therefore, the apertures 80 and 82 are also vertically offset (as shown in FIG. 5A) from each other a distance sufficient to provide enough space between adjacent elements 28 and 34 to prevent those elements from contacting and bonding to each other as they travel toward the web 62.

Figure 5B:
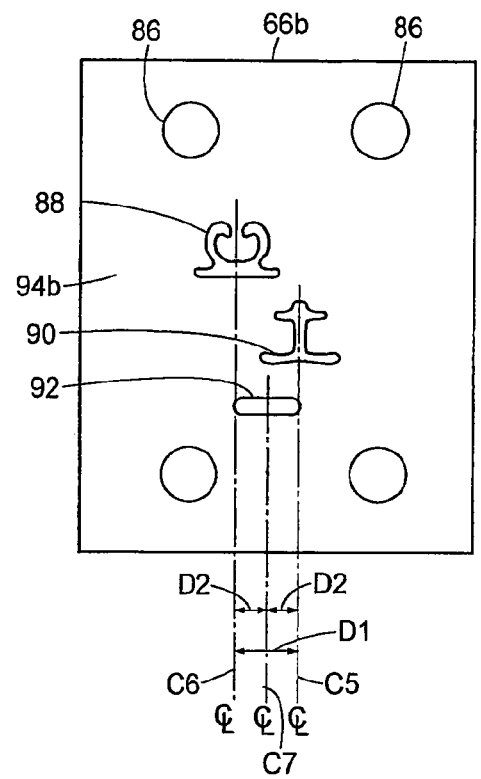

Referring to FIG. 5B, the second die plate 66b includes apertures 88, 90, and 92 arranged similarly to the apertures 80, 82, and 84 in the first die plate 66a having vertical offsets and partial lateral overlaps, but with the apertures appropriately shaped and spaced to form the closure elements 30, 32 and the bead element 36 between the closure elements. The apertures 88, 90, and 92 are disposed on centerlines C5, C6, and C7 that are preferably aligned with the centerlines C1, C2, and C3, respectively, such that the centerlines of the apertures are laterally spaced from each other by the distances D1 and D2.

The size, shape, and relative positions of the apertures 80, 82, 84 and 88, 90, 92 in each die plate 66a and 66b, respectively, are preferably designed, both individually and as a set, in order to provide a balanced flow rate of extrudate through all the apertures in the die plate. If the apertures are not correctly designed, the extrudate may flow through one aperture, or one area of one aperture, more rapidly than through other areas of the apertures, which may cause the final closure elements 28-34 to have incorrect shapes and/or sizes and prevent the closure elements from functioning properly. To initially balance the apertures in a die plate, the layout of the apertures, including the area, shape, and relative positions of the apertures, is varied by trial and error until a layout is achieved that produces acceptable closure elements. After obtaining a balanced layout, changes can be made to an individual aperture by changing the shape in small increments and generally keeping the area of the aperture constant.

Figure 5C:
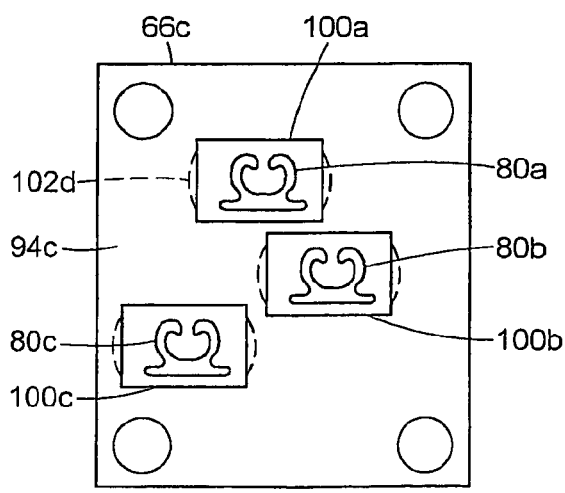
FIGS. 5C and 5D are elevational views similar to that of FIGS. 5A and 5B of the exit faces of alternative die plates according to the present invention.
Figure 5D:
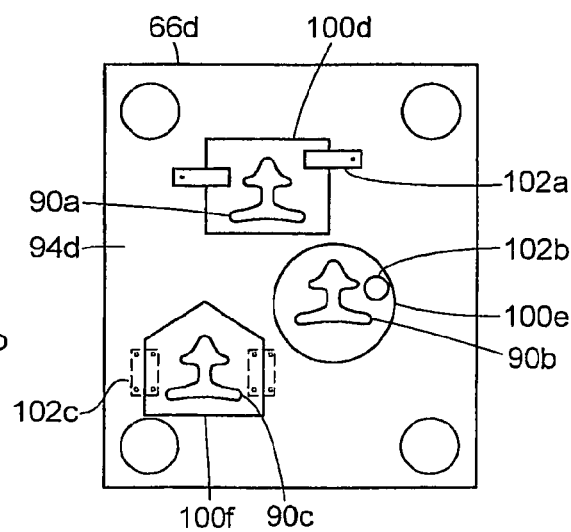

Referring to FIGS. 5C and 5D, an alternative set of die plates 66c, 66d are shown that may be used to form different closure mechanisms (not shown) similar to the closure mechanisms 24, 26 except that three female closure elements are all disposed on one bag wall and three male closure elements are disposed on the opposite bag wall. In FIG. 5C, three female apertures 80a-80c are disposed in the exit face 94c of the die plate 66c. Each aperture 80a-80c laterally overlaps the adjacent aperture and is vertically spaced therefrom. Each aperture 80a-80c is located in a removable aperture plate 100a-100c that may be inserted and removed from the die plate 66c. Preferably, the aperture plates 100a-100c have the same shape and dimensions so that the aperture plates are interchangeable. In FIG. 5D, three male apertures 90a-90c are disposed in the exit face 94d of the die plate 66d and located in removable aperture plates 100d-100f, respectively. Each aperture 90a-90c laterally overlaps the laterally adjacent aperture and is vertically spaced therefrom. Each aperture plate 100d-100f has a different shape, which ensures that each aperture plate is located correctly in the die plate 66d. Aperture plate 100f is further shaped such that the plate 100f can only be fitted into the die plate 66d having the correct orientation. Any suitable fastener may be used to secure the aperture plates 100 to the die plates 66c, 66d, such as screws or bolts, rotatable clips 102a located on the face 94d, threaded shafts 102b, fastenable plates 102c on a back face, or resilient snap-fit fasteners 102d. Alternatively, the aperture plates 100 may have a tapered edges that fit within complementary tapered openings in the die plate 66 such that no fasteners are needed to hold the aperture plates in the die plate. In this case, the tapered edges and tapered openings taper toward the exit face 94 of the die plate 66. Further, although the die plates 66c, 66d are illustrated as having apertures for extruding only three closure elements, the die plates may be adapted to have any number and type of apertures to produce any desired layout of extruded elements on a web. Also, the apertures for extruding any adjacent pair of closure or bead elements may not need to be vertically offset if the distance between those elements is large enough on the web such that that the outlines of the apertures do not overlap.

Figure 6A:
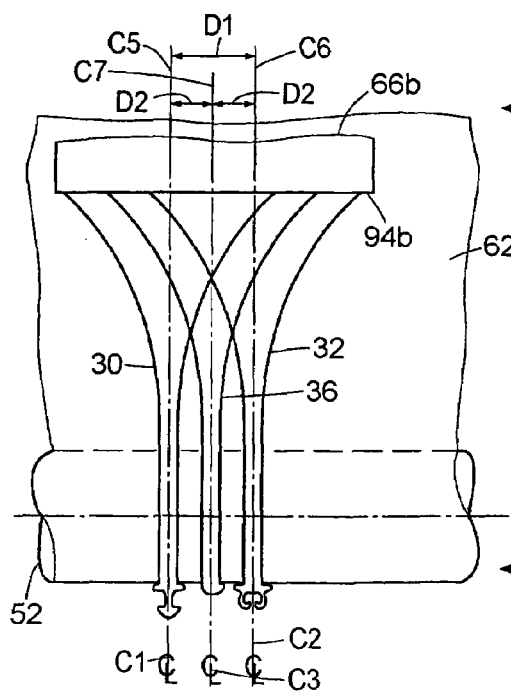
FIG. 6A is an exaggerated fragmentary diagrammatic view of the extrusion apparatus as viewed generally along the lines 6A-6A of FIG. 4.
Figure 6B:
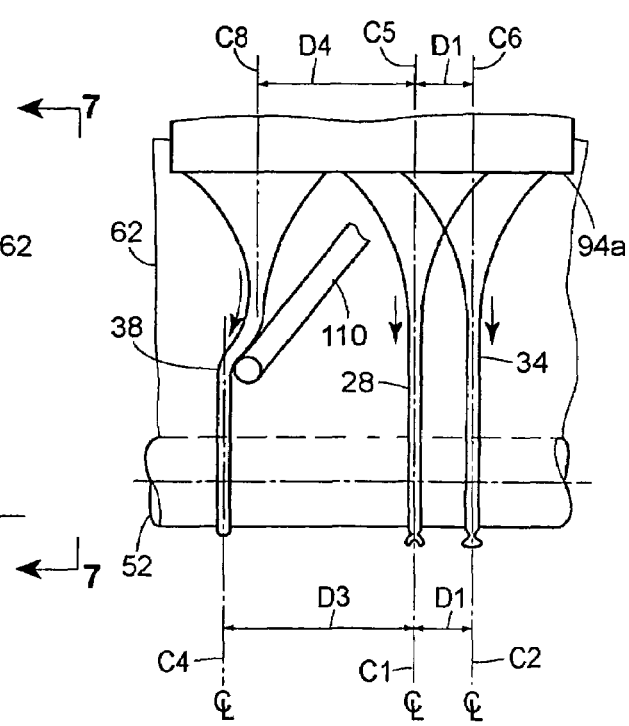
FIG. 6B is an exaggerated fragmentary diagrammatic view similar to FIG. 6A of the extrusion apparatus as viewed generally along the lines 6B-6B of FIG. 4.
Figure 7:
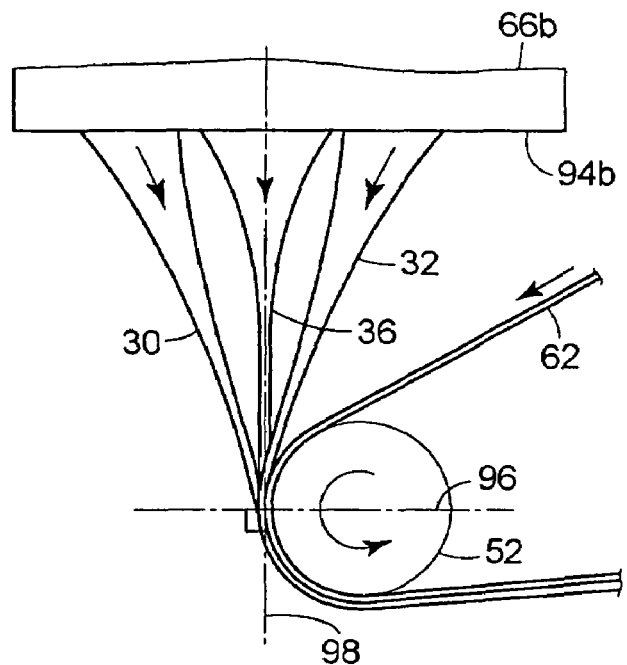
FIG. 7 is an exaggerated fragmentary diagrammatic view of the extrusion apparatus as viewed generally along the lines 7-7 of FIG. 6A.

Referring to FIGS. 6A, 6B, and 7, the angle of an exit face 94a, 94b of each die plate 66a, 66b is at least initially disposed substantially parallel to a horizontal radial line 96 extending from the center of the casting roll 52. The position of each die 58a, 58b may then be adjusted by moving the die left, right, up, or down (all as seen in FIG. 7) or the die may be tipped (i.e., angularly displaced) to adjust the angle of the die face 94a, 94b to obtain desirable results. At least one of the closure and bead elements 28, 34, 38 or 30, 32, 36 formed by the dies 58a, 58b preferably exits the die at a point coincident with a vertical tangent line 98 (FIG. 7) intersecting the surface of the casting roll 52 on the side where the web 62 is first deposited thereon. Because of the vertical offset of the apertures 80, 82, 84 or 88, 90, 92 (as shown in FIGS. 5A and 5B) at least one of the apertures will be slightly offset left or right of the vertical tangent line 98 as shown in FIG. 7. Alternatively, all of the closure and bead elements 28, 34, 38 or 30, 32, 36 may exit the die plates 66a or 66b at points displaced to the right or left (as seen in FIG. 7) of the tangent line 98. If the extrudate exits the die plates 66a, 66b at a point displaced to the left of the line 98, some provision must be made at the initiation of production to attach the extrudate stream to the casting roll 52. Thereafter, production may commence, (provided that the apertures in the die plates 66a, 66b are not disposed too far to the left of the tangent line 98) whereupon the melt strength of the extrudate stream carries the stream into contact with the roll 52. Regardless of the left or right offset of the apertures 88-92 (as seen in FIG. 7), the extruded elements 30, 32, 36 preferably extend along centerlines C1, C2, and C3, respectively, in substantially parallel vertical planes that are perpendicular to the web 62 (best seen in FIG. 6A). The extrudate stream forming the lip line bead element 38 (seen in FIG. 6B) is preferably, although not necessarily, shifted laterally with a guide means such as a guide rod 110 to obtain the desired lateral distance D3 between the closure element 28 and the bead element 38. Additionally, all the closure and bead elements 28, 34, 38 may be laterally shifted together by moving the die plate 66a laterally with respect to the web 62. This ability to shift the elements 28, 34, 38 provides increased flexibility during manufacturing in the relative placement of the closure elements 28, 34 and the bead element 38 with respect to the edge 64a of the web 62. The guide rod 110 may be used to shift the lip line bead element 38 in either lateral direction, i.e., left or right as seen in FIG. 6B. Alternatively, the lip line bead element may be allowed to flow straight down onto the web 62, if desired. Although not illustrated, the guide rod 110 could be used alternatively or additionally to laterally shift any the element 36, if desired.

FIGS. 6A and 7 show in greatly exaggerated form the relative positions of the extrudate streams that form the closure/bead elements 30, 32, 36 as the streams flow and neck down between the apertures 88, 90, 92 in the die plate 66b and the casting roll 52. The extrudate streams initially partially overlap each other in the lateral direction because of the small distances D1 and D2 between the centerlines C1, C2, C3, as seen in FIG. 6, but the vertical offset of the apertures 88, 90, 92 (as illustrated in FIG. 5B) causes the streams to remain spaced from each other in the direction of the horizontal radial line 96 near the die plate, as seen in FIG. 7. The spacings between the streams increase at an intermediate location between the die plate 66b and the casting roll 52 because of the shrinking and necking down. Thereafter, the streams converge onto the plane of the web 62 (best seen in FIG. 7) while maintaining the desired lateral spacing such that the streams do not bond to each other (best seen in FIG. 6)A. FIG. 6B shows similarly to FIG. 6A how the extrudate streams that form the closure elements 28, 34 neck-in from a laterally overlapping configuration near the apertures 80, 82 to a laterally spaced configuration near the web 62.

Once the molten thermoplastic from the die plates 66a, 66b has been deposited onto the web 62, coolant is applied to the closure and bead elements 28-38 by cooling apparatus 60a, 60b to bring the temperature thereof below the melting point of the thermoplastic material, thereby forming the elements as quickly as possible. Preferably, the coolant comprises water or any other suitable cooling fluid and the coolant is applied to the material of the closure elements 28-38 only after such material contacts the material of the web 62 so that adhesion thereto is optimized. The web 62 and the closure and bead elements 28-38 are maintained in contact with the temperature-controlled casting roll 52 for a period of time as the roll is rotated so that the web and closure/bead elements are further cooled. The casting roll 52 should be maintained at a temperature below the melting point of the thermoplastic materials forming the web 62 and the closure/bead elements 28-38, typically about 20-80 degrees C.

Figure 8:
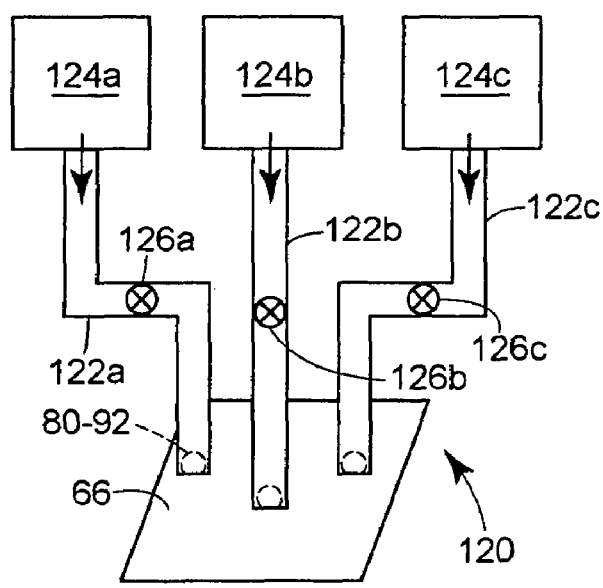
FIG. 8 is a partial diagrammatic view of an alternative extrusion apparatus for extruding closure mechanisms according to the method of the present invention.

Referring to FIG. 8, an alternative extrusion apparatus 120 may be used with any of the die plates 66a-66d, in which a separate extrudate feed line 122a-122c extends to each aperture 80-92 in the die plate. If each feed line 122a-122c has a separate flow control apparatus, then it may not be necessary to specially design the die plate 66 such that there is a balanced flow rate of extrudate through the apertures 80-92. Rather, the flow rate of extrudate through each aperture 80-92 may be controlled by the individual feed line flow control apparatus. Such flow control apparatus may be in the form of separate extruders 124a-124c and/or flow control valves 126a-126c located in each feed line 122a-122c. The flow control valves 126a-126c are advantageous if the feed lines 122a-122c extend from a common source of molten material. If, however, the die plate 66 is designed to have balanced flow rate, then no special flow control is needed for each feed line 122a-122c, and the feed lines may extend from a common source of molten material without requiring individual flow control apparatus for each feed line.

The method disclosed above is not limited to forming an entire pouch, but may be easily adapted if desired, to form zipper tape. In such a case, the closure elements and/or bead elements of the above embodiment can be separately extruded on internal surfaces of flanges to form zipper tape having two closely spaced closure elements. The zipper tape may be subsequently post-applied to film in a bag production process.

Thermoplastic pouches similar to that described above can be produced by any suitable bag-making process, such as a cast post applied process, in which the closure elements are extruded separately from die plates similar to die plates 66a, 66b onto the film web that forms the bag walls. It should also be noted that the extrusion die(s) used to form the closure mechanisms and strip(s) must include a suitable number of die plates to form such structures. In addition, an air nozzle may be provided in association with each female closure element that blows air into the opening of each C-shaped female profile member to open the member as it is being extruded.

INDUSTRIAL APPLICABILITY

The method and apparatus described herein may be used to form the pouch and zipper tape described herein, which advantageously creates a perception of a wide-track feel that guides a user's fingers during closure thereof. The method and apparatus eliminates the need to extrude an interconnecting portion between two (or more) closely spaced closure elements and still form multiple, individual, closely spaced closure elements through a single die plate for subsequent application to a film web.

Numerous modifications will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A die plate including opposing top and bottom edges, the die plate comprising:
    a first aperture through a face of the die plate, wherein the first aperture outlines a first closure element extending from a first base portion; and
    a second aperture through the face, wherein the second aperture outlines a second closure element extending from a second base portion;
    wherein the first aperture is vertically spaced from the second aperture on the face and partially overlaps the second aperture in the lateral direction, and wherein each of the first and second base portions is oriented toward the bottom edge of the die plate.

2. The die plate of claim 1, wherein the first aperture is shaped to extrude a male closure element and the second aperture is shaped to extrude a female closure element.

3. The die plate of claim 1, wherein the first and second apertures are both shaped to extrude male closure elements.

4. The die plate of claim 1, wherein the first and second apertures are both shaped to extrude female closure elements.

5. The die plate of claim 1, and further comprising a third aperture through the face, wherein the third aperture is spaced from the first and second apertures.

6. The die plate of claim 5, wherein the third aperture is shaped for extruding a bead element.

7. The die plate of claim 6, wherein the third aperture is located between the first and second apertures in the lateral direction and partially overlaps at least one of the first and second apertures in the lateral direction.

8. The die plate of claim 5, wherein all of the apertures are shaped for extruding closure elements.

9. The die plate of claim 8, wherein the third aperture partially overlaps one of the first and second apertures in the lateral direction.

10. The die plate of claim 1, wherein at least one of the first and second apertures is located in a removable portion of the die plate.

11. The die plate of claim 1, wherein the first aperture is located in a first removable portion of the die plate and the second aperture is located in a second removable portion of the die plate, and wherein the first and second removable portions are interchangeable with each other.

* * * * *

UNITED STATES PATENT AND TRADEMARK OFFICE
CERTIFICATE OF CORRECTION

PATENT NO. : 7,494,333 B2 Page 1 of 1
APPLICATION NO. : 10/861607
DATED : February 24, 2009
INVENTOR(S) : James C. Pawloski It is certified that error appears in the above-identified patent and that said Letters Patent is hereby corrected as shown below:

On the title page, item [57]:
Abstract, Line 1: replace "A method of" with --An apparatus for--

Signed and Sealed this

First Day of September, 2009

David J. Kappos
*Director of the United States Patent and Trademark Office*